Dec. 30, 1969     M. AUPHAN     3,486,506

HEART-ACTUATED, SPRING DRIVEN CARDIAC STIMULATOR

Filed Oct. 5, 1966

INVENTOR.
MICHEL AUPHAN
BY
AGENT

United States Patent Office 3,486,506
Patented Dec. 30, 1969

3,486,506
HEART-ACTUATED, SPRING DRIVEN CARDIAC STIMULATOR
Michel Auphan, Neuilly-sur-Seine, France, assignor, by mesne assignments, to U.S. Philips Corporation, New York, N.Y., a corporation of Delaware
Filed Oct. 5, 1966, Ser. No. 584,422
Claims priority, application France, Oct. 13, 1965, 34,749
Int. Cl. A61n 1/36; H02k 1/34
U.S. Cl. 128—419            11 Claims

ABSTRACT OF THE DISCLOSURE

A cardiac Pacemaker that includes a balance wheel driven by the heart movement. The balance wheel in turn oscillates a permanent magnet rotor to induce electric pulses in a stator winding. These pulses are applied to the cardiac muscle by means of electrodes to stimulate the heart action. The apparatus eliminates the need for batteries so that surgical replacement of worn batteries is no longer necessary.

---

This invention relates to a cardiac regulator and more particularly to a regulator device to be arranged within the human body produces electrical pulses at a constant predetermined frequency, said pulses being transferred to the cardiac muscle by means of electrodes in order to stimulate the function of the heart.

The use of cardiac Pacemaker devices with given diseases is known. It is also known to derive the energy required for operating such devices from a battery placed within the human body. However, because of its limited lifetime, the battery has to be replaced from time to time, so that in each case a medical operation is once again necessary.

Another disadvantage of battery operated Pacemakers is that such devices are generally too large in size to permit their positioning in engagement with the heart as a result, they are arranged at a small distance, for example, at the level of the midriff, and connected to the electrodes on the cardiac muscle by means of flexible wires. Said wires, which are moved due to the palpitation of the heart, may rupture and this will naturally have very serious consequences.

An object of the invention is to obviate these disadvantages. To this end, the invention provides a device for producing electric stimulation of the heart which is small in size and does not require the use of a battery as the power source.

The intracorporal device to which the invention relates, and which produces electrical pulses which are transferred to the cardiac muscle by means of electrodes in order to stimulate the function of the heart, comprises an alternating current generator having a rotor in the form of a permanent magnet, means being provided which cause the rotary element of the generator, due to the movement of the heart, to perform an oscillatory rotational movement.

Figure 1:
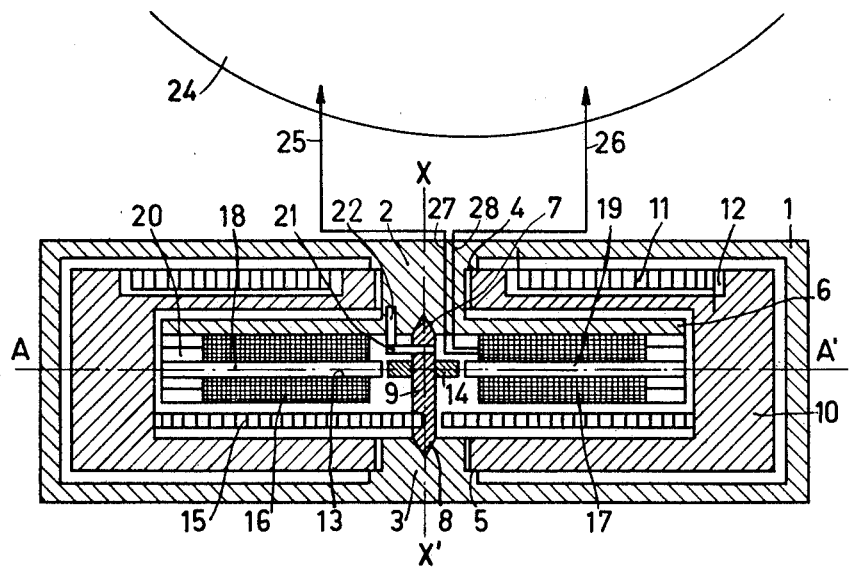
Figure 2:
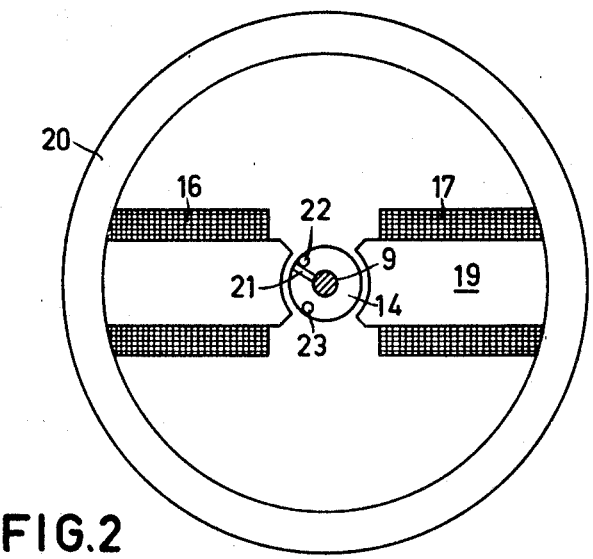

In order that the invention may be readily carried into effect, it will now be described in detail, by way of example, with reference to the accompanying diagrammatic drawing, in which:

FIG. 1 shows a device for producing electric stimulation of the heart in accordance with the invention; and FIG. 2 is a sectional view in a plane at right angles to the surface of FIG. 1 and passing through the axis A–A'.

The pulse generator proper is housed in a hermetically closed metallic box 1, preferably covered on the outside with a thin layer of a synthetic material which does not affect the human body. The box is enacuated in order to avoid losses through air friction. The opposing walls of the box have internal central elevations 2 and 3 with re-entrant parts 4 and 5 which serve as bearing blocks. One bearing block terminates in a platform 6, the function of which will be explained hereinafter. The bearing blocks 2 and 3 are provided with cavities 7 and 8, respectively, which support the conical ends of a spindle 9 having an axis of revolution X–X'. A hollow balance wheel 10 is supported on the re-entrant surfaces 4 and 5 of the bearing blocks so that it can rotate about the axis X–X'. A spiral spring 11, located in a cavity 12 of the balance wheel, couples the box 1 to the balance wheel 10. The central part of the balance wheel is hollow in order to accommodate the platform 6, which in turn supports a stator 13 of a small size alternating current generator (in this example the platform has a fixed position relative to the box).

In the present embodiment, the rotor of the alternating current generator comprises a cylindrical magnet 14 fixed on the spindle 9. A second spiral spring 15 couples the spindle 9 (and hence the cylindrical magnet) to the balance wheel 10. The two spiral springs and the mass of the balance wheel are so proportioned that the period of the balance wheel approximates, as far as possible, the period of the heart beat.

In the example illustrated the alternating current generator is unipolar. The magnet has North and South poles and the stator comprises two coils 16 and 17 having cores 18 and 19. The cores form part of a closed magnetic circuit through a ring 20 of magnetic material which is secured to the platform 6 (FIG. 2). The spindle 9 carries an abutment fin 21 which extends between two fixed abutment pins 22 and 23. The movement of the magnet is limited by the said pins to an angle of $\pi/2$ radians. The pins are positioned so that in one position the magnetic flux passing through the stator is a minimum unstable position of the magnet) and in the other position the maximum flux occurs (stable position of the magnet). It is also possible to use an alternating current generator having $n$ pair of poles. The abutments are then arranged to limit the movement of the magnet to an angle of $\pi/2n$ radians.

The position occupied by the box within the body must be chosen so that the movement of the heart causes a rotational movement of the stimulating device. For this purpose, use may be made of the rectilinear movement of the heart point. For example, a point located on the outer edge of the box may be secured to a strip of flexible material (preferably synthetic material) which is attached to a fixed eccentric point on a rib. Upon each heart beat the box performs an alternating rotational movement about the fixed point, which movement is transferred to the balance wheel by the spring 11. Since the balance wheel is in resonance, its amplitude is comparatively great. The balance wheel thus has sufficient energy to drive the rotor 14, via the coupling provided by the spiral spring 15, between the abutment 23 (corresponding to the maximum flux) and the abutment 22 (corresponding to the minimum flux) and hence through an angle of $\pi/2$ radians. By way of example, it may be assumed that an amplitude from plus to minus of 1 to ½ revolution is sufficient for a balance wheel having a torque of approximately 30 gms./cm.

As soon as the abutment fin 21 engages the abutment 22 (corresponding to the minimum flux), the rotor 14 stops and remains stationary as long as the fin is urged against the abutment by the spiral spring 15, i.e. during the whole first half period in which the balance wheel 10 returns after reversal of the direction of movement. When the balance wheel reaches the neutral point the spring 15 no longer checks the rotor. The rotor, which is now driven by the two spiral springs as well as by the magnetic attraction between stator and rotor, starts to rotate towards the abutment 23, thus producing an electrical pulse in the coils of the stator 13. This pulse actuates the contraction of the cardiac muscle, designated by reference numeral 24, by means of electrodes of the conventional type (usually of platinum) shown diagrammatically by the arrows 25 and 26. The said electrodes are connected to the coil 17 by insulated wires 27 and 28 passing through a small aperture in the wall of the box 1. Since, as previously mentioned, the device for producing the electric pulses can be placed in the vicinity of the heart, the flexible wires can be very short so that the risk of rupture is reduced. Under the conditions described, the heart beats in the rhythm of the balance wheel.

The invention is not limited to the embodiment above described and, within the scope of the invention, certain modifications are possible. More particularly, with regard to the attachment of the box, by covering the box with a thin layer of platinum the box itself, for example, can serve as one of the electrodes and with regard to the attachment of the balance wheel, the bearing blocks may be replaced, for example, by ball-bearings.

What is claimed is:

1. An electric pulse generator adapted to be implanted within a human body for electrically stimulating the cardiac muscle comprising, stator winding means, a permanent magnet rotor rotatably mounted adjacent said stator winding means for inducing electric potentials therein, means responsive to the movement of the heart for imparting an oscillatory rotary motion to said rotor at approximately the frequency of the heart beat, a housing enclosing the aforesaid elements, and a pair of electrodes coupled to said stator winding means and adapted to contact said cardiac muscle to apply electric pulses thereto at the heart beat frequency.

2. A pulse generator as claimed in claim 1 wherein said motion imparting means comprises a balance wheel mounted to rotate about the same axis as the rotor, a first resilient member connecting said balance wheel to a part of the body which is moved due to the movement of the heart, and a second resilient member coupling said balance wheel to the rotor.

3. A pulse generator as claimed in claim 2 further comprising fixed abutment members for limiting the rotation of the rotor independently of the rotational movement of the balance wheel so that the rotor rotation is considerably less than the rotational displacement of the balance wheel.

4. A pulse generator as claimed in claim 2 wherein said housing comprises an air-tight box that encloses the moving members, said first resilient member comprises a first spiral spring secured to the balance wheel and to the wall of the box, and said second resilient member comprises a second spiral spring secured to the balance wheel and to the rotor of the generator.

5. A pulse generator as claimed in claim 4 wherein at least one wall of the box is made of metal and establishes the electrical connection between one terminal of the stator winding and the cardiac muscle.

6. A pulse generator as claimed in claim 1 further comprising, magnetic core means for said stator winding, and means responsive to the rotor for limiting rotor oscillation between first and second end points at which the stator flux produced by the rotor magnet is a maximum and a minimum, respectively.

7. A pulse generator as claimed in claim 6 wherein said oscillation limiting means are arranged to limit the rotor oscillation to an angle of $\pi/2N$ radians, wherein N is the number of generator pole pairs.

8. A pulse generator as claimed in claim 1 wherein said motion imparting means includes means responsive to the movement of the heart for storing mechanical energy and subsequently releasing said energy to the rotor in synchronism with the heart beat.

9. A pulse generator as claimed in claim 8 wherein said housing comprises an air tight container that is evacuated of air to reduce the air friction on the rotor.

10. A pulse generator as claimed in claim 1 wherein said motion imparting means comprises a balance wheel coaxially mounted to rotate about the rotor axis, first and second resilient members connecting the balance wheel to a part of the body that moves in synchronism with the heart beat and to the rotor, respectively, said balance wheel and said resilient members being chosen to have a natural period that is approximately the same as the period of the heart beat, and means for limiting the rotor oscillation independently of the rotation of the balance wheel.

11. A pulse generator as claimed in claim 10 wherein said resilient members each comprise a spiral spring that is alternately wound and unwound so that the balance wheel oscillates within a given arc, and said housing comprises a metallic container lined on the outside with a thin layer of synthetic material.

References Cited

UNITED STATES PATENTS

| | | | |
|---|---|---|---|
| 1,454,528 | 5/1923 | Wiemann | 128—421 X |
| 2,995,132 | 8/1961 | Browner | 128—424 X |

OTHER REFERENCES

Myers et al.: "American Journal of Medical Electronics," October-December 1964, pp. 233–236.

WILLIAM E. KAMM, Primary Examiner

U.S. Cl. X.R.

310—37, 74, 156